Feb. 7, 1933.                C. L. HALL                1,896,865
                       DETACHABLE CLIP MEMBER
                         Filed June 2, 1931
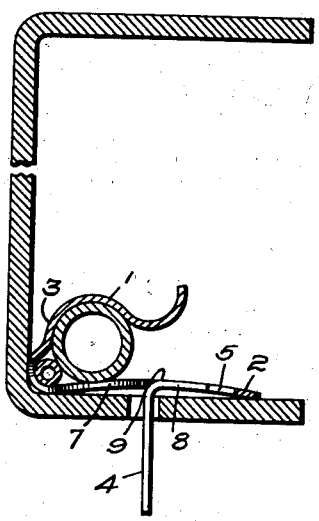
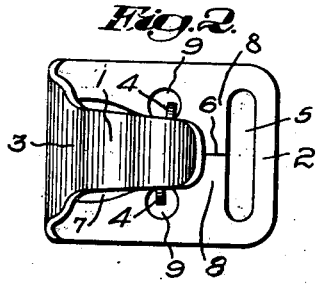 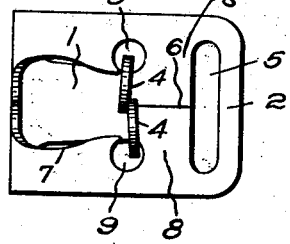
Inventor:
Charles L. Hall
by Emery, Booth, Varney & Townsend
Attys

Patented Feb. 7, 1933

1,896,865

UNITED STATES PATENT OFFICE

CHARLES L. HALL, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

DETACHABLE CLIP MEMBER

Application filed June 2, 1931. Serial No. 541,563.

My invention aims to provide improvements in detachable clip members for use in connection with holding in position conduits such as pipes, wires and the like.

In the drawing which illustrates a preferred embodiment of my invention:—

Figure 1 is a section through an installation showing my improved clip member in one use thereof;

Fig. 2 is a top plan view of the clip member shown in Figure 1; and

Fig. 3 is a bottom plan view of the clip member.

Referring to the particular clip device illustrated by the drawing, I have shown a snap fastener attached clip which is particularly, though not exclusively, adapted for use in connection with securing gasoline pipes, air pipes, electric wires and the like to structures such as automobile bodies and frames, one particular embodiment of which is illustrated in Figure 1.

My improved clip device is preferably formed from a single piece of yieldable sheet metal having a clip-like portion which is U-shaped to provide a pair of fingers 1 and 2 connected at one end by a portion 3. These fingers are yieldable toward and away from each other and are so shaped that they may receive between them and hold securely in position one or more wires, pipes, or combinations of both, such, for instance, as shown in Figure 1.

The clip portion of the device is adapted to be secured in position upon a frame or the like by means of a snap fastening which comprises a pair of socket-engaging portions 4—4. The socket-engaging portions are formed from material located entirely within the periphery of the clip portion and in the particular device illustrated are formed particularly from the finger 2 and from the connecting portion 3, as best illustrated in Figs. 1 and 3. The socket-engaging portions 4—4 are arranged somewhat in overlapping relation (Fig. 3) and extend at substantially a right angle from the finger 2 (Fig. 1) so that they may have a scissors-like action when being engaged with or disengaged from a supporting structure. In order to secure maximum resiliency for the operation of the socket-engaging portions 4—4, I have provided a T-shaped cut which is located in the finger 2 between the socket-engaging portions 4—4 and the free end of the finger 2. This T-shaped cut comprises a slot 5 adjacent to the free end of the finger 2 (Figs. 2 and 3) and extending transversely relative to the clip portion. The other portion is in the form of a slit 6 which divides a portion of the finger 2 located between the slot 5 and the opening 7 formed by cutting out the socket-engaging portions 4—4, thereby providing yieldable portions 8—8, as best shown in Fig. 3. Notches 9—9 are cut in the finger 2 adjacent to the socket-engaging portions thereby to provide free edges for the portions 8—8 of substantially the same length so that the portions 8—8 may bend along lines extending transversely with relation to the finger 2 throughout the entire length of each of the yieldable portions 8 when the socket-engaging portions 4—4 are moved toward and away from each other in a scissors-like action. The line of bend of each portion 8 is therefore along a line extending longitudinally relative to the device and which extends between the aperture 9 and the slot 5. So far as I am aware the scissors-like action of the socket-engaging portions in previous similar devices was secured by a twisting action of the yieldable portions to which the socket-engaging portions were connected. My improved device eliminates the necessity for a twisting action and it provides a device wherein the socket-engaging portions are less apt to become set.

My improved clip members are simple, durable, easy to manufacture and are reduced to a minimum with respect to the amount of material necessary because of the construction defined above.

While I have illustrated and described a preferred embodiment of my invention, I do not wish to be limited thereby because the scope of my invention is best defined by the following claims.

I claim:

1. A snap fastener device having a pair of spaced finger portions joined at one end and adapted to receive an element between them, snap fastening means formed from material entirely within the periphery of said device and mostly from one of said fingers inwardly from the free end and toward the joined end, said snap fastening means extending outwardly from that finger and comprising a pair of socket-engaging portions arranged to move toward and away from each other, said finger from which said snap fastening means project having a transverse cut spaced inwardly from the free end thereof and having a longitudinal cut extending from between the socket-engaging portions to the transverse cut thereby providing yieldable portions connected to said socket-engaging portions, and said yieldable portions being adapted to bend upon lines extending longitudinally relative to said device thereby permitting the movement of said socket-engaging portions.

2. A snap fastener device having a pair of spaced finger portions joined at one end and adapted to receive an element between them, snap fastening means formed from material within the periphery of said device and mostly from one of said fingers, said snap fastening means extending outwardly from that finger and comprising a pair of socket-engaging portions arranged to pass one another in scissors-like fashion and a T-shaped cut formed in said finger from which said socket-engaging portions extend, said T-shaped cut being located between the socket-engaging portions where they join the finger and the free end of that finger thereby to provide yieldable portions connected to said socket-engaging portions and said yieldable portions being adapted to bend upon lines extending longitudinally relative to said device thereby permitting the scissors-like action of said socket-engaging portions.

3. A snap fastener device of the class described having a pair of spaced fingers 1 and 2 joined at one end to provide a yieldable clip-like portion, snap fastening portions 4—4 formed from the material of said clip portion and extending from said finger 2 and providing a space 7 in the finger 2 between the portions 4—4 and the joined portion of the finger, a slot 5 extending transversely of the finger 2 adjacent to its free end and a slit 6 extending from the opening 7 to the slot 5 thereby to provide between the opening 7 and the slot 5 two yieldable portions 8—8 one for each of the socket-engaging portions 4—4, said finger with the space 7 also having notches 9—9 extending from said space adjacent to said fastening portions 4—4 and said yieldable portions 8—8 being adapted to bend along lines extending longitudinally relative to the finger 2 from the slot 5 to the notches 9—9 to permit said socket-engaging portions to move relative to each other.

In testimony whereof, I have signed my name to this specification.

CHARLES L. HALL.